United States Patent
Kozloski et al.

(10) Patent No.: US 10,455,287 B2
(45) Date of Patent: Oct. 22, 2019

(54) CONTENT DELIVERY SYSTEM, METHOD, AND RECORDING MEDIUM

(71) Applicant: International Business Machines Corporation, Armonk, NY (US)

(72) Inventors: James R. Kozloski, New Fairfield, CT (US); Clifford A. Pickover, Yorktown Heights, NY (US); Maja Vukovic, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 74 days.

(21) Appl. No.: 15/013,618

(22) Filed: Feb. 2, 2016

(65) Prior Publication Data

US 2017/0223413 A1   Aug. 3, 2017

(51) Int. Cl.
| | |
|---|---|
| *H04N 21/466* | (2011.01) |
| *G06F 3/01* | (2006.01) |
| *H04N 21/4223* | (2011.01) |
| *H04N 21/422* | (2011.01) |
| *H04N 21/25* | (2011.01) |
| *H04N 21/6587* | (2011.01) |
| *H04N 21/442* | (2011.01) |
| *H04N 21/2343* | (2011.01) |
| *H04N 21/43* | (2011.01) |

(52) U.S. Cl.
CPC ......... *H04N 21/4667* (2013.01); *G06F 3/013* (2013.01); *G06F 3/015* (2013.01); *H04N 21/23439* (2013.01); *H04N 21/252* (2013.01); *H04N 21/4223* (2013.01); *H04N 21/42201* (2013.01); *H04N 21/4307* (2013.01); *H04N 21/442* (2013.01); *H04N 21/44218* (2013.01); *H04N 21/6587* (2013.01)

(58) Field of Classification Search
CPC ..................... H04N 21/44218; H04N 21/4307
See application file for complete search history.

(56) References Cited

U.S. PATENT DOCUMENTS

| | | | |
|---|---|---|---|
| 8,793,727 B2 | 7/2014 | Serdiuk | |
| 8,875,167 B2 | 10/2014 | Stiers et al. | |
| 9,032,472 B2 | 5/2015 | Mertens | |
| 9,335,819 B1 * | 5/2016 | Jaeger | G06F 3/013 |
| 2008/0066129 A1 * | 3/2008 | Katcher | G06F 17/30855 |
| | | | 725/109 |

(Continued)

OTHER PUBLICATIONS

Takahashi et al.; "Estimation of Attentiveness of People Watching TV Based on Thier Emotional Bahaviors", ACII, IEEE Conference on, Sep. 2-5, 2013, pp. 809-814.

(Continued)

*Primary Examiner* — Joshua D Taylor
(74) *Attorney, Agent, or Firm* — Rahan Uddin, Esq.; McGinn IP Law Group, PLLC (57) ABSTRACT

A content delivery method, system, and non-transitory computer readable medium, include a media playback device configured to play media content, a determination device configured to determine a cognitive state of a user in response to viewing of the media content, and an action device configured to perform an action regarding a progression of the media content played by the playback device based on the cognitive state determined by the determination device.

14 Claims, 5 Drawing Sheets

(56) References Cited

U.S. PATENT DOCUMENTS

| | | |
|---|---|---|
| 2008/0169930 A1 | 7/2008 | Mallinson |
| 2009/0070798 A1 | 3/2009 | Lee et al. |
| 2009/0245756 A1* | 10/2009 | Cirrincione ............ G11B 27/10 386/291 |
| 2013/0343721 A1* | 12/2013 | Abecassis .......... H04N 21/4307 386/241 |
| 2014/0047464 A1* | 2/2014 | Lev .................... H04N 21/4223 725/12 |
| 2014/0150002 A1* | 5/2014 | Hough ............... H04N 21/4415 725/9 |
| 2014/0201767 A1* | 7/2014 | Seiden ............. H04N 21/44218 725/12 |
| 2014/0215086 A1 | 7/2014 | Pitschel et al. |
| 2014/0282642 A1 | 9/2014 | Needham et al. |
| 2014/0309849 A1* | 10/2014 | Ricci ........................ B60Q 1/00 701/33.4 |
| 2014/0347265 A1 | 11/2014 | Aimone et al. |
| 2015/0033266 A1* | 1/2015 | Klappert ................ G06F 3/015 725/52 |
| 2015/0189387 A1 | 7/2015 | Golyshko et al. |
| 2015/0271548 A1* | 9/2015 | Daub ............... H04N 21/44008 725/12 |
| 2015/0296239 A1 | 10/2015 | Burger et al. |
| 2015/0351680 A1 | 12/2015 | Gordon et al. |

OTHER PUBLICATIONS

Okoshi et al.; "Attelia: Sensing User's Attention Status on Smart Phones", UBICOMP'14 ADJUNCT, ACM Joint Conference on, Sep. 13-17, 2014, pp. 139-142.

\* cited by examiner

CONTENT DELIVERY SYSTEM, METHOD, AND RECORDING MEDIUM

BACKGROUND

The present invention relates generally to a content delivery system, and more particularly, but not by way of limitation, to a content delivery system that, based on a cognitive state of a viewer, the system takes actions regarding the progression of media content playing.

Conventional techniques provide intelligent user control options for consuming media content such as video images to one or more viewers. These conventional techniques attempt to automate such facilities by utilizing an eye gaze attention recognition system which detects when a viewer's pupils are directed at a viewing screen. Detection of attention or non-attention can then be used to pause playback of media content. However, these conventional techniques require expensive eye gaze detection equipment which also requires a light source to illuminate the pupils of the viewer.

Thus, there is a technical problem in that the conventional techniques are incapable of providing a content delivery system that can automatically determine an action to be taken based on a user's cognitive state.

SUMMARY

In an exemplary embodiment, the present invention can provide a content delivery system, including a media playback device configured to play media content, a determination device configured to determine a cognitive state of a user in response to viewing of the media content, and an action device configured to perform an action regarding a progression of the media content played by the playback device based on the cognitive state determined by the determination device.

Further, in another exemplary embodiment, the present invention can provide a non-transitory computer-readable recording medium recording a content delivery program, the program causing a computer to perform: playing media content, determining a cognitive state of a user in response to viewing of the media content, and performing an action regarding a progression of the media content played by the playing based on the cognitive state determined by the determining.

Even further, in another exemplary embodiment, the present invention can provide a content delivery method, including playing media content, determining a cognitive state of a user in response to viewing of the media content, and performing an action regarding a progression of the media content played by the playing based on the cognitive state determined by the determining.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION

The invention will now be described with reference to FIGS. 1-5, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

Figure 1:
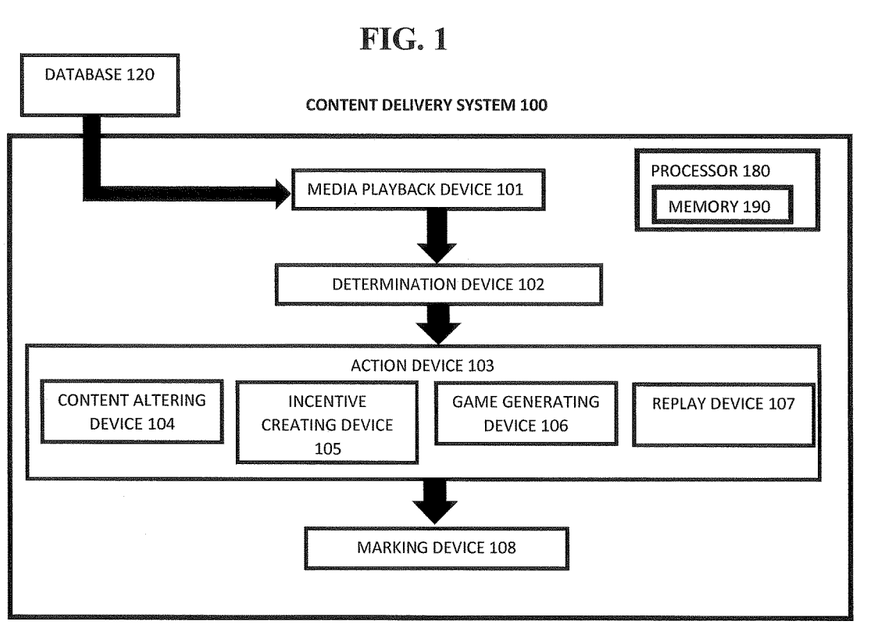
FIG. 1 exemplarily shows a block diagram illustrating a configuration of a content delivery system 100.

With reference now to FIG. 1, the content delivery system 100 includes a media playback device 101, a determination device 102, an action device 103, and a marking device 108. The content delivery system 100 includes a processor 180 and a memory 190, with the memory 190 storing instructions to cause the processor 180 to execute each device of content delivery system 100. The processor and memory may be physical hardware components, or a combination of hardware and software components.

Although the content delivery system 100 includes various devices, it should be noted that a content delivery system can include modules in which the memory 190 stores instructions to cause the processor 180 to execute each module of content delivery system 100.

With the use of these various devices, the content delivery system 100 may act in a more sophisticated and useful fashion, and in a cognitive manner while giving the impression of mental abilities and processes related to knowledge, attention, memory, judgment and evaluation, reasoning, and advanced computation. That is, a system is said to be "cognitive" if it possesses macro-scale properties—perception, goal-oriented behavior, learning/memory and action—that characterize systems (i.e., humans) that all agree are cognitive.

Cognitive states are defined as functions of measures of a user's total behavior collected over some period of time from at least one personal information collector (including musculoskeletal gestures, speech gestures, eye movements, internal physiological changes, measured by imaging devices, microphones, physiological and kinematic sensors in a high dimensional measurement space) within a lower dimensional feature space. In one exemplary embodiment, certain feature extraction techniques are used for identifying certain cognitive and emotional traits. Specifically, the reduction of a set of behavioral measures over some period of time to a set of feature nodes and vectors, corresponding to the behavioral measures' representations in the lower dimensional feature space, is used to identify the emergence of a certain cognitive states over that period of time. One or more preferred embodiments use certain feature extraction techniques for identifying certain cognitive states. The relationship of one feature node to other similar nodes through edges in a graph corresponds to the temporal order of transitions from one set of measures and the feature nodes and vectors to another. Some connected subgraphs of the feature nodes are herein also defined as a cognitive state. The present application also describes the analysis, categorization, and identification of these cognitive states by means of further feature analysis of subgraphs, including dimensionality reduction of the subgraphs, for example by means of graphical analysis, which extracts topological features and categorizes the resultant subgraph and its associated feature nodes and edges within a subgraph feature space.

Figure 3:
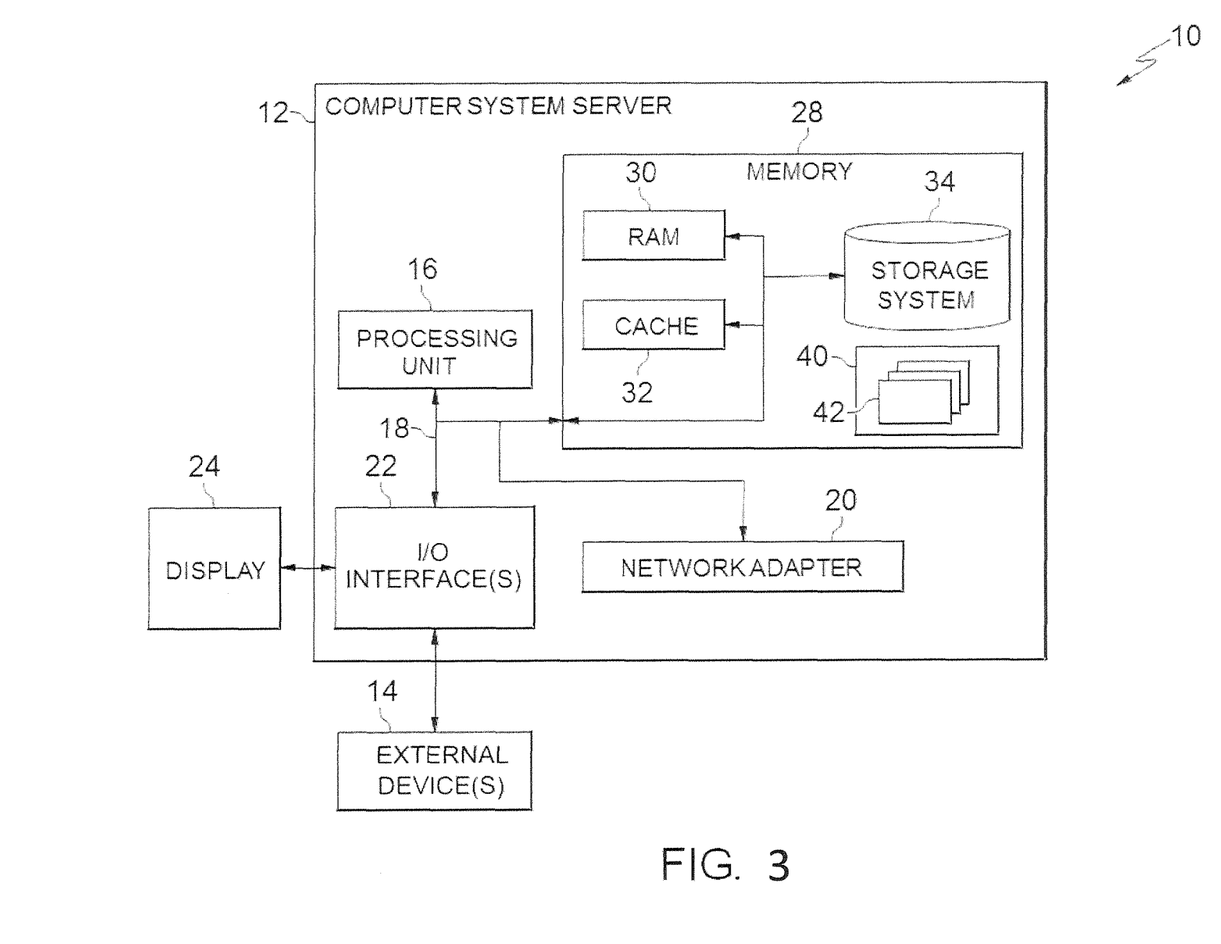
FIG. 3 depicts a cloud computing node 10 according to an embodiment of the present invention.
Figure 4:
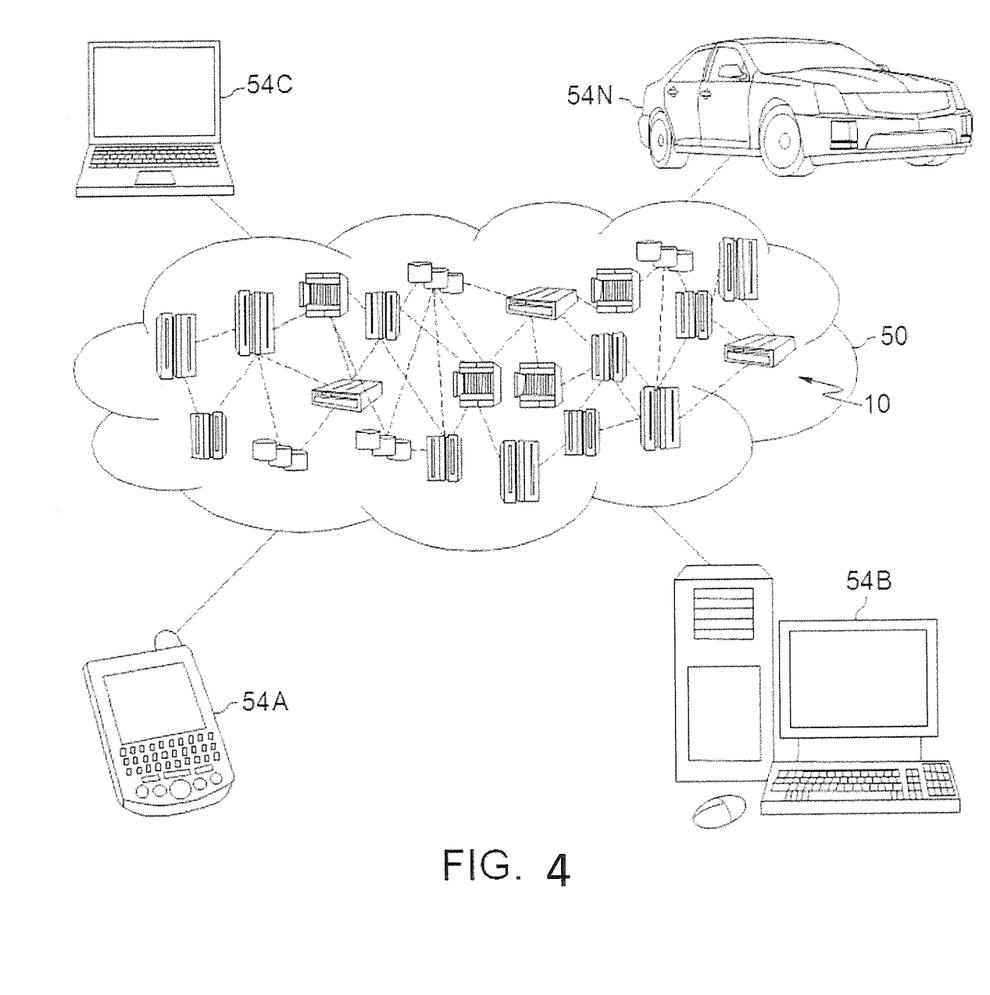
FIG. 4 depicts a cloud computing environment 50 according to another embodiment of the present invention.
Figure 5:
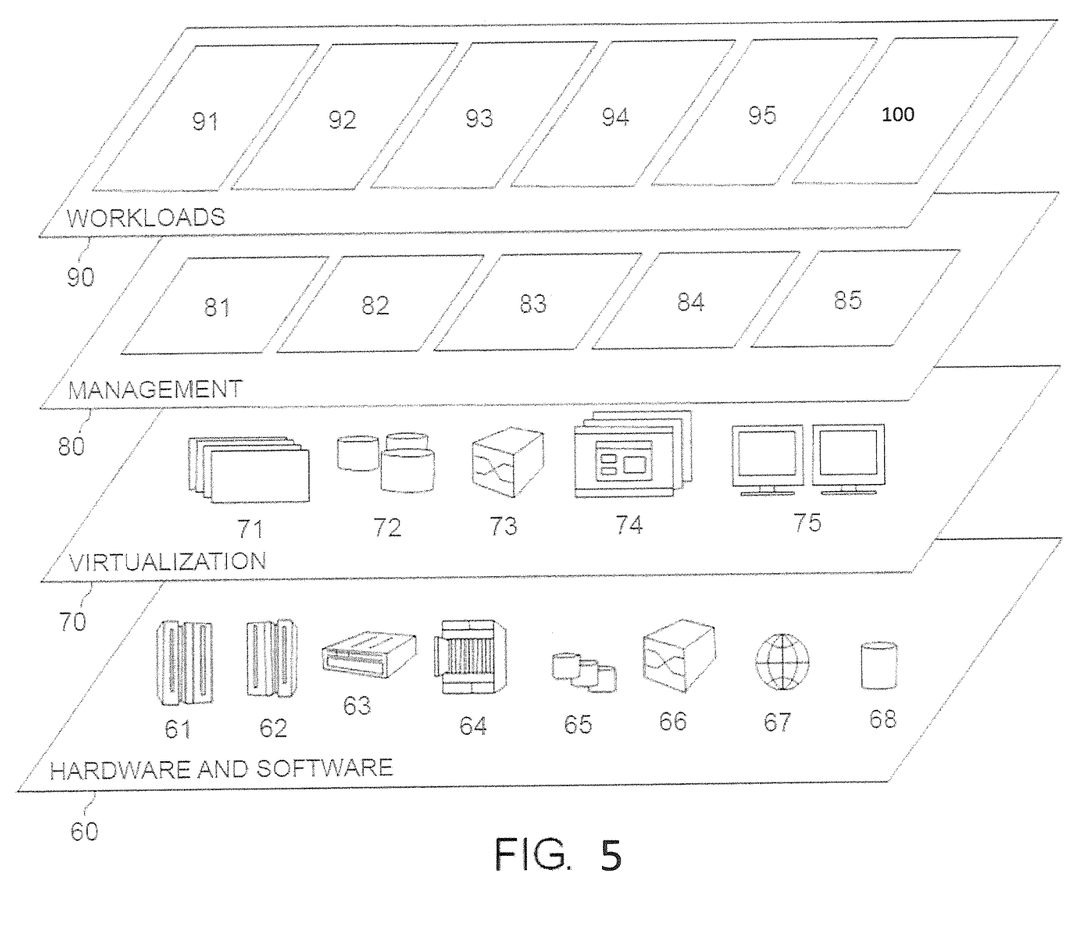
FIG. 5 depicts abstraction model layers according to an embodiment of the present invention.

Although as shown in FIGS. 3-5 and as described later, the computer system/server 12 is exemplarily shown in cloud computing node 10 as a general-purpose computing device which may execute in a layer the content delivery system 100 (FIG. 5), it is noted that the present invention can be implemented outside of the cloud environment.

The content delivery system 100 receives media content from a database 120. The media content may be include: audio book, television (TV) show, movie, educational video, eBook, etc.

The media content stored in the database 120 can be user specific content. For example, the database 120 can store a user's library of media content. The library of media content stored in the database 120 can be customized for the specific user.

That is, the database 120 includes a pre-configuration of media content for a particular purpose such as being therapeutic, educational, emotional, etc. The pre-configured media content includes annotated media content such that the actions taken by the action device 103 execute one of the annotated media content actions to give the user a desired result based on the user's cognitive state.

For example, if the pre-configured media content is a movie, the movie can be pre-configured to include annotations that are educational about the plot of the movie such that if a user is determined by the determination device 102 to be confused while watching the movie, the action device 103 can alter the movie to play an educational segment such that the user can better enjoy the movie when the movie resumes.

The pre-configured media content in the database 120 can be based on a user input, mined data from the user's other files, etc.

The media playback device 101 plays the pre-configured media content selected by a user from the database 120.

While the media playback device 101 is playing media content, the determination device 102 determines a user's cognitive state with regards to the media content.

The determining of cognitive state by the determination device 102 can include analyzing: brainwaves, eye tracking, amount of yawning, facial expression analysis, other activities by the viewer such as head turning, speaking, etc. Moreover, the determinative factors to calculate the cognitive state may include distraction, fatigue, decrease in alertness, drifting off to sleep, etc. Also, the determinative factors to calculate the cognitive state may be include multitasking on other subjects, for example, as determined by a phone call, switching between windows on a computer screen, usage of a smart phone, etc. that the nature of the multitasking may be recorded so as to aid in predictions for the next potential times of decreased attentiveness.

The determination device 102 can analyze biometrics of the user for the viewer's focus levels, facial reactions and mood swings while watching a video.

The determination device 102 can also analyze online content generated by the user on social media while the media content is playing, analyze the mood (based upon physiological parameters) and analyze the perception (based upon eye movements and facial expressions) of the viewer.

The determination device 102 can also actively track content read by a user on the web or social media using eye tracking methods, and analyze the viewer's reaction to reading the content (i.e., happy, sad, angry, confused, bored, etc.), with respect to the nature of the content (i.e., funny, thought-provoking, melancholy, etc.), including content directly about the topic being shown currently in the video.

Thus, the determination device 102 determines the cognitive state of a user based on the above-mentioned factors. The determination device 102 also determines an attentiveness factor "A" based on the cognitive state of the user.

Based on the cognitive state determined by the determination device 102, the action device 103 initiates an action regarding the progression of the media playback. The action taken may include a pause in media, marking of media stream (e.g., so the user can easily return to the place that he lost attention, became confused), etc. The action device 103 performs an action on the media playback when the attentiveness factor "A" determined by the determination device is less than a pre-determined threshold value "T". Also, the action device 103 can predict the attentiveness factor "A" based on previous actions taken for a cohort of a user, and then an action is taken to decrease the predicted likelihood of low attentiveness (e.g., change the content and presentation slightly).

Further, a user reading an e-book as the media content may have certain pages modified based on "A"<"T" by the action device 103 such that when scrolling through these pages subsequently, the scrolling is modified (for example, scrolling slows). Alternatively, text could be presented with different (bright) highlighting or the like. Similarly, a user of an audio-book or video as the media content may have certain sections marked based on "A"<"T" such that the section/track indicators are superseded by "attentional section/track markers" and the user can then access these markers through the standard "skip" interface on the media playback device 101.

The action device 103 includes a content altering device 104, an incentive creating device 105, a game generating device 106, and a replay device 107.

The content altering device 104 alters the playback of the media content based on the user's cognitive state. For example, if a user is listening to an audio book as the media content on the history of the U.S. Civil War, and the attentiveness factor "A" has waned beneath a threshold "T" ("A"<"T") during a segment on the Battle of Fort Sumter, then the content altering device 104 alters the media content to increase attentiveness factor "A" by altering the content (e.g. visual (showing additional images such as war cannons), sound (such as the sound of cannons, guns, and/or bugle calls), narrator voice, color intensity, volume, intonation and inflection, etc.), and the nature of the advantageous change in content is learned for different cohorts of users (e.g. autism, pre-Alzheimer, teenager, demographic, grade level, gender, occupation, education level, etc.).

The incentive creating device 105 creates an incentive to increase the attentiveness factor "A" by including points, access to restricted features, etc., and the nature of the incentive is learned for different cohorts of users.

Content consumption and cognitive engagement can be enabled or facilitated through the automatic triggering of "gamification" features in certain regions of the media content by the game generating device 106. In other words, when the attentiveness factor "A" decreases (e.g., to mean the threshold or below it), a gaming element (either in the form of a scoreboard, interactive play, or similar) may be triggered by the game generating device 106. Users losing attention at the same areas of interest may automatically be entered into a competing or collaborating mode so as to keep focused on the topic of interest, as appropriate.

The gamification mode may be exited by the game generating device 106 when "A">"T". This gamification trigger may occur at the time "A"<"T" or when the user returns to regions of low-A content for re-review.

This gamification by the game generating device 106 may also occur for other media content that is related to the low-A regions in the first piece of media content. For example, if Fort Sumter is judged to be important in a history class, then a photo or phrase or paragraph or video, may be "gamified" in the next three days when the user is browsing the web, examining other material related to a class, examining complementary or similar e-Books for a class, etc.

In a related scenario, if "A"<"T", an optional triggering of additional sensory modalities by the game generating device 106 are employed and/or a virtual world immersion can be employed (if the subject is deemed important above a threshold importance value "I"). For example, the user is transported to a virtual Fort Sumter, where the sounds of cannon fire are heard, where the stench of gunpowder fills the ear (via an olfaction output unit), where various animations are seen, etc.).

It is noted that "gamification" can be the application of game-design elements and game principles in non-game contexts. Gamification employs game design elements which are used in so called "non-game contexts" in attempts to improve user engagement, organizational productivity, flow, learning, employee recruitment and evaluation, ease of use and usefulness of systems, physical exercise, traffic violations, and voter apathy, among others.

The replay device 107 replays the media content when the attentiveness factor "A" is less than the predetermined threshold "T". When the attentiveness factor "A" falls below the predetermined threshold "T", the media content is marked such that when the user re-focuses on the media content and the attentiveness factor "A" is above the predetermined threshold "T", the replay device 107 will replay the media content to the point where the attentiveness factor "A" fell below the predetermined threshold "T". For example, the replay device 107 can be sensitive to a user falling asleep, and may record ambient states whenever the user does so, providing easy accessing of those states when the user is awakened.

Further, the replay device 107 can send the media content to a different system (i.e., smartphone, smartwatch, coffee pot with speech output, animated doll with speech output, etc.) that includes a second media playback device to replay the media content from a point that an attentiveness factor of the user is less than a predetermined threshold. In other words, if the user is watching the media content on a computer, the replay device 107 can send the media content to, for example, a television for replay. Such an action would be more likely to hold the user's attention at least in the near-term.

The marking device 108 marks other media content to include sections of the current media content in which the attentiveness factor "A" has fallen below the predetermined threshold "T". The marking device 108 can mark other venues based on if the content is judged to be important and for which ("A"<"T"). "Other venues" include different devices or systems that are marked to play different media content related to the initial media content that the user lost attentiveness for.

For example, if Fort Sumter is judged to be important in a history class, then a photo or phrase or paragraph or video, may be highlighted in the next three days when the user is browsing the web, examining other material related to a class, examining complementary or similar electronic books (eBooks) for a class, etc. That is, the marking device 108 integrates the sections of the media content that the user has had the attentiveness factor "A" below the predetermined threshold "T", into other venues. That is, the marking device marks a different venue to play different media content related to the initial media content when an attentiveness factor of the user is less than a predetermined threshold for the initial media content. The different media content being identified as related to the initial media content.

Also, the marking device 108 can mark the segment on an electronic calendar or digital video recorder (DVR) of the subject/topic of the media content for which the attentiveness factor "A" fell below the predetermined threshold "T". This may be performed based on topic extraction methods.

For example, if a user is listening to an audio book on the history of the U.S. Civil War, and the attentiveness factor "A" is below the predetermined threshold "T" ("A"<"T") during the segment on the Battle of Fort Sumter, then the topic of this section may be noted on the calendar or DVR (at the time/day of loss of such user attention), and the media playback device 101 can return to this section. Moreover, the actual image of Fort Sumter (and or objects related to Fort Sumter) may be highlighted in the video stream when the section of media is replayed.

Figure 2:
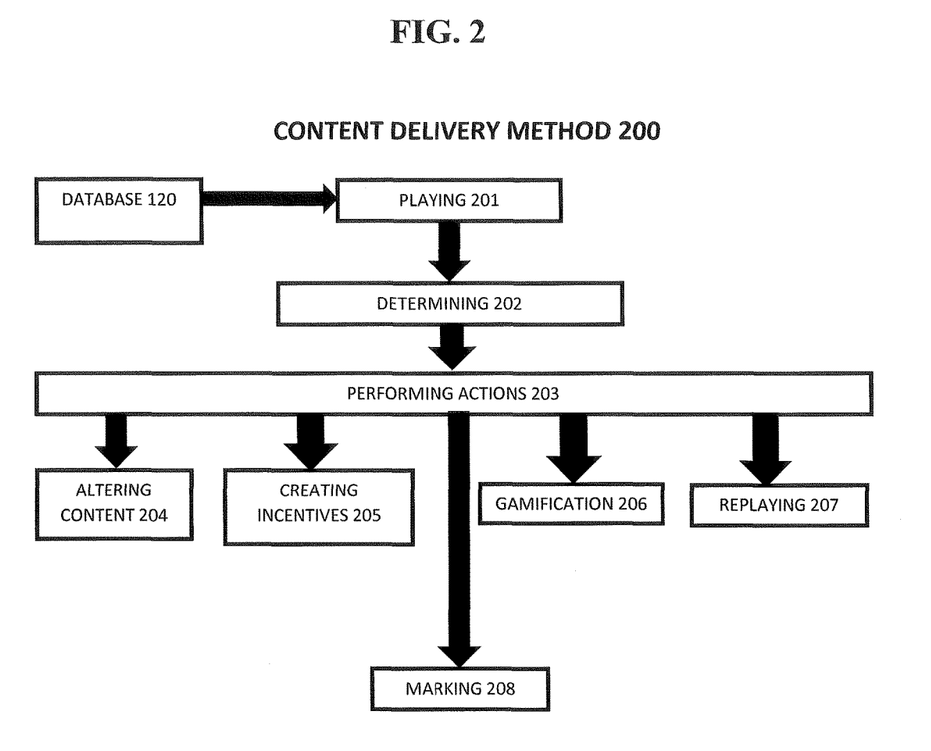
FIG. 2 exemplarily shows a high level flow chart for a content delivery method 200.

FIG. 2 shows a high level flow chart for a method 200 of content delivery.

Step 201 plays media content from a database 120.

Step 202 determines a user's cognitive state with regard to the media content played in Step 201.

Based on the cognitive state determined in Step 202, Step 203 initiates an action regarding the progression of the media playback. The action taken in Step 203 may include a pause in media, marking of the media stream (e.g. so user can easily return to the place that he lost attention), etc.

Step 204 alters the playback of the media content based on the cognitive state of the user in Step 202.

Step 205 creates an incentive to increase the attentiveness factor "A" of the user cognitive state by including points, access to restricted features, etc., and the nature of the incentive is learned for different cohorts of users.

Step 206 enables content consumption and cognitive engagement by the automatic triggering of gamification features in certain regions of content.

Step 207 replays the media content based on the user's cognitive state in Step 202.

Step 208 marks other media content to include sections of the current media content in which the attentiveness factor "A" has fallen below the predetermined threshold "T"

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the content delivery system 100 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A content delivery system, comprising:
   a media playback device configured to play media content;
   a determination device configured to determine a cognitive state of a user in response to viewing of the media content; and
   an action device configured to perform an action regarding a progression of the media content played by the media playback device based on the cognitive state determined by the determination device,
   wherein the action device includes a content altering device configured to alter the media content by adding a content feature related to a subject of the media content to the media content when an attentiveness factor of the user is determined to be less than a predetermined threshold to newly create a second media content as an independent data file from the media content as a result of the alteration, the media content stopping being played and only the second media content being played instead of the media content, and
   wherein the second media content comprises an explanation that clarifies the subject of the media content,
   further comprising a marking device configured to mark a different venue to play the media content when the attentiveness factor of the user is determined to be less than the predetermined threshold.

2. The system of claim 1, wherein the media content includes at least one of:
   an audio book;
   a television show;
   a movie;
   an educational movie; and
   an electronic book (e-Book).

3. The system of claim 1, wherein the determination device determines the cognitive state of the user based on at least one of:
   brainwaves;
   eye tracking;
   an amount of yawning; and
   facial expression analysis.

4. The system of claim 1, wherein the cognitive state comprises a factor of at least one of a distraction amount, a fatigue amount, a decrease in alertness, and a drifting off to sleep of the user.

5. The system of claim 1, wherein the action device includes a replay device configured to cause the media playback device to replay the media content starting from a point that an attentiveness factor of the user is determined to be less than a predetermined threshold.

6. The system of claim 1, wherein the action device includes a replay device configured to send the media content to a different system with a second media playback device to replay the media content from a point that an attentiveness factor of the user is determined to be less than a predetermined threshold.

7. The system of claim 1, wherein the content altering device alters the media content by altering at least one of:
   a visual modification of the media content;
   sound;
   a narrator voice;
   a color intensity; and
   volume.

8. The system of claim 1, wherein the content altering device alters the media content based on learned data from cohorts of users.

9. The system of claim 1, wherein the action device includes an incentive creating device configured to create an incentive to increase an attentiveness factor when the attentiveness factor of the user is determined to be less than a predetermined threshold.

10. The system of claim 1, wherein the action device includes a game generation device configured to trigger a gaming element associated with the media content to increase an attentiveness factor of the user.

11. The system of claim 10, wherein the game generation device automatically triggers the gaming element to be associated with the media content when the attentiveness factor of the user is determined to be less than a predetermined threshold.

12. The system of claim 1, wherein the media content is stored in a database, and
   wherein the media content includes pre-configured data associated with the media content such that the media content has an interactive element.

13. A non-transitory computer-readable recording medium recording a content delivery program, the program causing a computer to perform:
   playing media content;
   determining a cognitive state of a user in response to viewing of the media content;
   performing an action regarding a progression of the media content played by the playing based on the cognitive state determined by the determining; and
   performing a content altering action that alters the media content by adding a content feature related to a subject of the media content to the media content when an attentiveness factor of the user is determined to be less than a predetermined threshold to newly create a second media content as an independent data file from the media content as a result of the alteration, the media content stopping being played and only the second media content being played instead of the media content, and wherein the second media content comprises an explanation that clarifies the subject of the media content, further comprising further marking a different e to play the media content when attentiveness factor of the user is determined to be less than the predetermined threshold.

14. A content delivery method, comprising:

playing media content;

determining a cognitive state of a user in response to viewing of the media content;

performing an action regarding a progression of the media content played by the playing based on the cognitive state determined by the determining; and performing a content altering action that alters the media content by adding a content feature related to a subject of the media content to the media content when an attentiveness factor of the user is determined to be less than a predetermined threshold to newly create a second media content as an independent data file from the media content as a result of the alteration, the media content stopping being played and only the second media content being played instead of the media content, and wherein the second media content comprises an explanation that clarifies the subject of the media content, further comprising further marking a different venue to play the media content when the attentiveness factor of the user is determined to be less than the predetermined threshold.

* * * * *